United States Patent [19]

Takada et al.

[11] Patent Number: 4,796,037
[45] Date of Patent: Jan. 3, 1989

[54] COMPACT IMAGE RECORDING APPARATUS HAVING AN UP-SIDE DOWN STRUCTURE

[75] Inventors: Hiromi Takada, Yokohama; Toshio Shimazaki, Tokyo; Keiji Okamoto; Hideo Aoki, both of Yokohama, all of Japan

[73] Assignee: Ricoh Company, Limited, Tokyo, Japan

[21] Appl. No.: 166,974

[22] Filed: Mar. 11, 1988

[30] Foreign Application Priority Data

Mar. 11, 1987 [JP] Japan .................................. 62-53961

[51] Int. Cl.⁴ ............................................. G01D 15/00
[52] U.S. Cl. .................................. 346/160.1; 346/160; 346/145
[58] Field of Search .................. 355/3 TE, 14 TR; 346/145, 160, 160.1, 105, 107 R, 108; 400/114; 101/DIG. 13

[56] References Cited

U.S. PATENT DOCUMENTS

4,673,956 6/1987 Kobayashi ........................... 346/160
4,739,350 4/1988 Arao ................................... 346/160

*Primary Examiner*—Arthur G. Evans
*Attorney, Agent, or Firm*—Cooper & Dunham

[57] ABSTRACT

A compact laser printer has an up-side down arrangement of components within a machine housing. That is, an optical writing unit is disposed below a rotatably supported photosensitive drum and an image transferring unit is disposed above the photosensitive drum with a developing unit disposed substantially in a side-by-side relationship with the photosensitive drum. A paper feed cassette is located below the optical writing unit when detachably set in position and a paper transportation path extends from the supply end of the paper feed cassette around the developing unit generally in the shape of "U." The machine housing has a pivotally movable portion which may be pivoted open and closed. The photosensitive drum and/or one of a pair of registration rollers may be mounted on the pivotally movable portion.

14 Claims, 6 Drawing Sheets

COMPACT IMAGE RECORDING APPARATUS HAVING AN UP-SIDE DOWN STRUCTURE

BACKGROUND OF THE INVENTION

1. Field of the Invention

This invention generally relates to an image recording apparatus, and in particular to such an image recording apparatus including a photosensitive drum on which an image is formed by a light beam emitted from an optical writing device as modulated by an image information signal, such as a laser printer.

2. Description of the Prior Art

In an image recording apparatus, such as a laser printer or a facsimile machine, the emission of light is controlled by an image information signal or a laser beam is modulated by an image information signal to effect optical writing of an image on a photosensitive drum through an optical writing unit, so that an electrostatic latent image is formed on the drum. And the thus formed electrostatic latent image is then developed to form a visible, toner image which in turn is transferred onto a sheet of transfer paper by means of an image transfer corona unit. Then, the transferred toner image is permanently fixed onto the sheet of transfer paper as it moves through an image fixing unit.

In this type of an image recording apparatus, the optical writing unit is typically disposed above the photosensitive drum within a machine housing so that optical writing is typically effected at the top portion of the photosensitive drum. In addition, the image transfer corona unit is typically disposed below the photosensitive drum. Thus, an electrostatic latent image formed on the photosensitive drum at its top portion by the optical writing unit is developed to define a toner image which is then transferred onto a sheet of transfer paper, which is being transported with its imaging surface facing upward, at the bottom of the photosensitive drum.

With the above-described structure of a typical prior art image recording apparatus, when a paper supply unit was disposed side-by-side with a developing unit as projecting sideways or below the image transfer corona unit, there was provided a sufficient space for allowing a sheet of transfer paper to make an U turn without difficulty, which tended to make the entire structure larger in size. Besides, when a sheet of transfer paper happened to jam at the image transfer station or along a paper transportation path, it was necessary to set open the entire photosensitive drum unit including the optical writing unit, developing unit and photosensitive drum to remove the jammed sheet of transfer paper, which was a disadvantage from the operational viewpoint.

SUMMARY OF THE INVENTION

In accordance with the principle of the present invention, there is provided an image recording apparatus in which an optical writing unit is disposed below a photosensitive drum which is rotatably supported. With such an upside down structure, the overall size of the image recording apparatus can be made significantly smaller. In the preferred embodiment, an automatic paper supply unit is disposed below the optical writing unit and a developing unit is disposed substantially in a side-by-side relation with the photosensitive drum. In addition, an image transfer unit is preferably disposed above the photosensitive drum so that a sheet of transfer paper is being transported with its imaging surface, on which a toner image is to be transferred, facing downward. The apparatus also preferably includes a machine housing in which various units are disposed, and a top cover portion of the machine housing is pivotally supported to be pivotted to be open or closed. In the preferred embodiment, the top cover portion is provided with the image transfer corona unit and an upper roller which constitutes a part of a pair of registration upper and lower rollers.

It is therefore a primary object of the present invention to obviate the disadvantages of the prior art as described above and to provide an improved image recording apparatus.

Another object of the present invention is to provide a compact image recording apparatus of the optical beam writing type.

A further object of the present invention is to provide an improved image recording apparatus having an increased easiness in removing jammed paper.

A still further object of the present invention is to provide an improved laser printer compact in size and enhanced in operability.

Other objects, advantages and novel features of the present invention will become apparent from the following detailed description of the invention when considered in conjunction with the accompanying drawings.

DESCRIPTION OF THE PREFERRED EMBODIMENTS

Figure 1:
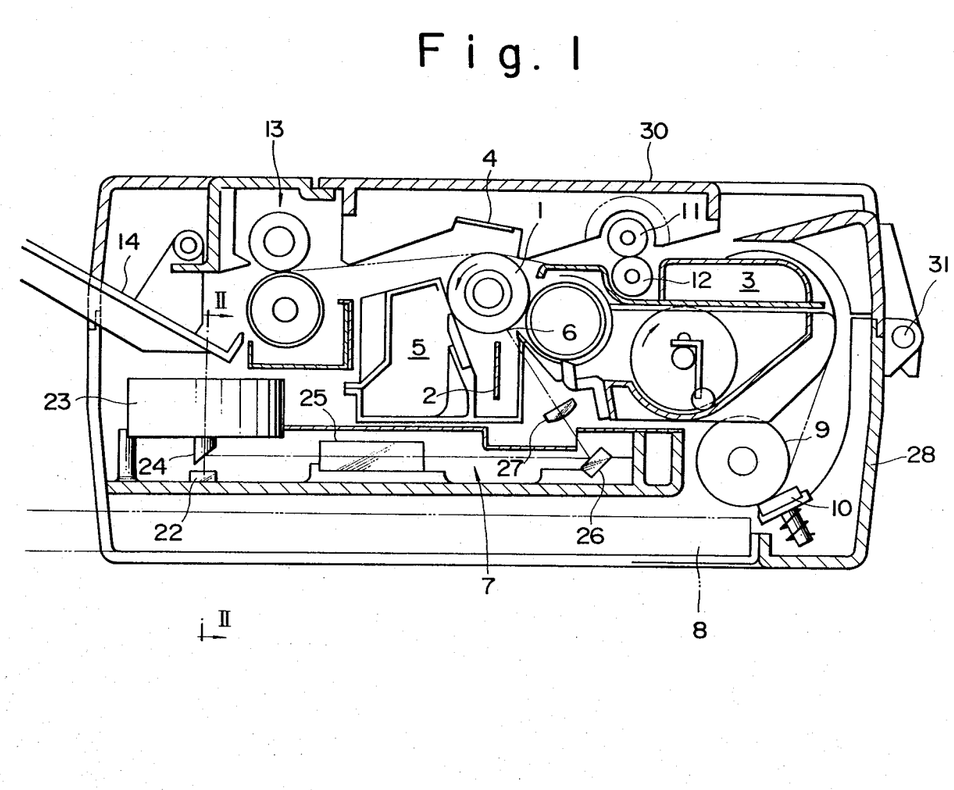
FIG. 1 is a schematic illustration showing the overall structure of a laser printer constructed in accordance with one embodiment of the present invention.

Referring now to FIG. 1, there is schematically shown a laser printer constructed in accordance with one embodiment of the present invention. As shown, the present laser printer includes a generally rectangularly shaped machine housing in which a photosensitive drum 1 is rotatably supported. The photosensitive drum 1 is driven to rotate counterclockwise as indicated by the arrow, and around the photosensitive drum 1 are disposed various image forming means, including a charging unit 2, a developing unit 3, an image transfer unit 4 and a cleaning unit 5 in the order mentioned in the direction of rotation of the drum 1. Also provided inside of the machine housing is an optical writing unit 7 which projects a light beam, which may carry image information, onto the photosensitive drum 1 at an optical writing position 6 which is hypothetically defined at the peripheral surface of the photosensitive drum 1 between the charging unit 2 and the developing unit 3.

In the illustrated embodiment, both of the charging and optical writing units 2 and 6 are disposed below the photosensitive drum 1 and the optical writing unit 7 is disposed below all of the photosensitive drum 1, developing unit 3 and cleaning unit 5. The image transfer unit 4, on the other hand, is disposed above the photosensitive drum 1. Also provided in the present laser printer is a paper feed cassette 8 which is disposed below the optical writing unit 7 for feeding a sheet of transfer paper to an image transfer station which is hypothetically defined between the image transfer unit 4 and the photosensitive drum 1. A quantity of sheets of transfer paper are stored in the paper feed cassette 8 and they are supplied one by one. For this purpose, a feed roller 9 is disposed at the supply end of the paper feed cassette 8 and a friction pad 10 is provided in pressure contact with the feed roller 9. Due to a cooperation between the feed roller 9 and its associated friction pad 10, the sheets of paper stored in the paper feed cassette 8 are controlled to be fed one by one.

The developing unit 3 is disposed to the right of the photosensitive drum 1 and thus substantially in a side-by-side relationship therewith. A paper transportation path is defined within the housing as extending from the supply end of the paper feed cassette 8 where the feed roller 9 and the friction pad 10 are disposed to a registration station where a pair of registration rollers 11 and 12 is disposed and which is defined immediately above the developing unit 3. The paper transportation path is generally U-shaped and it extends around part of the developing unit 3. Thus, a sheet of transfer paper supplied from the paper feed cassette 8 is transported around the developing unit 3 by following the generally U-shaped paper transportation path until its leading edge comes into contact with the pair of registration rollers 11 and 12, which is driven to rotate intermittently. Then, the pair of registration rollers 11 and 12 is driven to rotate in association with the rotation of the photosensitive drum 1 so that the sheet of transfer paper which has been held stationary temporarily is again transported toward the image transfer station defined between the image transfer unit 4 and the photosensitive drum 1. As the sheet of transfer paper is moved past the image transfer station, the toner image formed on the photosensitive drum 1 is transferred to the sheet of transfer paper. Then, the sheet of transfer paper carrying thereon the transferred toner image is then transported toward an image fixing unit 13 which is disposed to the left of the photosensitive drum 1 in a substantially side-by-side relationship therewith by following a paper transportation path extending from the image transfer station to the image fixing station. As the sheet of transfer paper is moved past the image fixing unit 13, the toner image carried thereon is permanently fixed thereto, and then the sheet of transfer paper having thereon a fixed toner image is discharged out onto a paper discharge tray 14.

Figure 2:
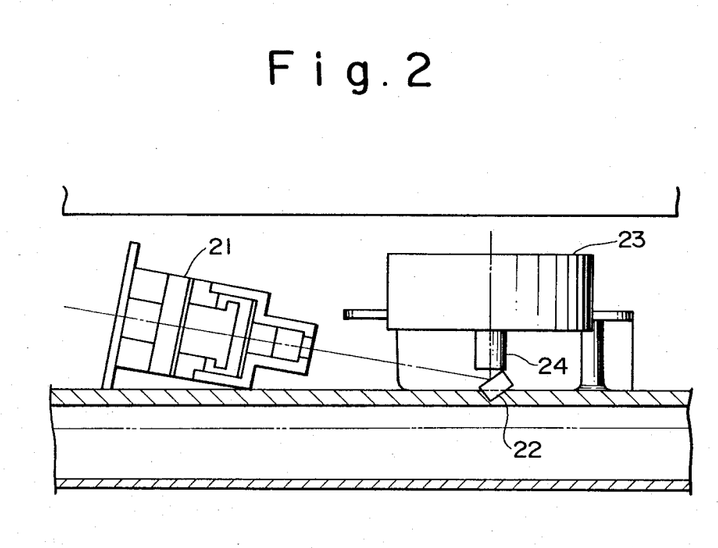
FIG. 2 is a fragmentary, cross-sectional view taken along line II—II indicated in FIG. 1.
Figure 3:
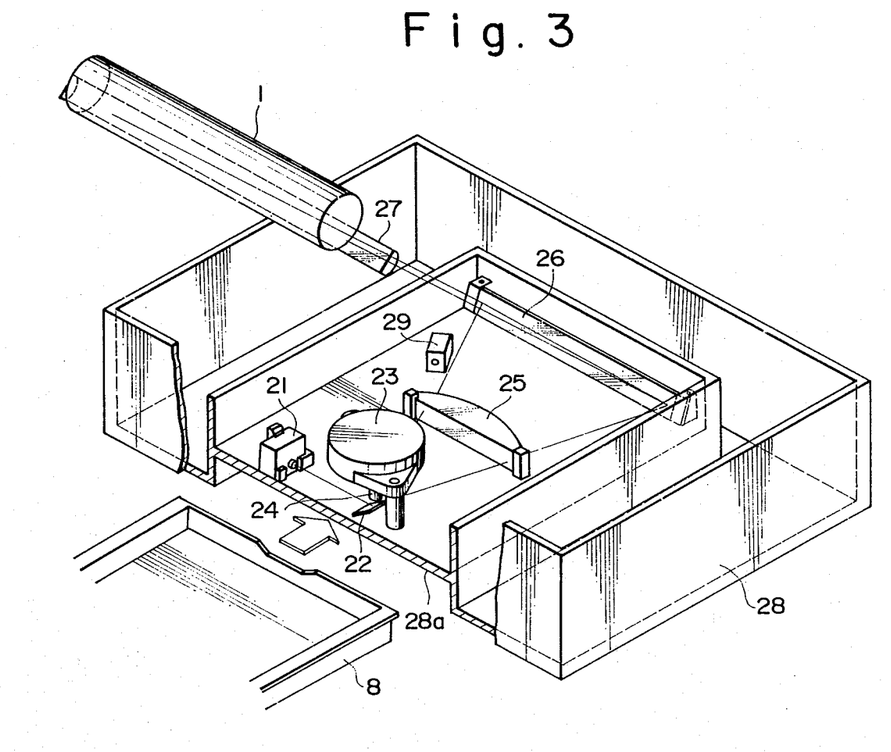
FIG. 3 is a perspective, partly cut-away view showing an optical writing unit provided in the structure shown in FIG. 1.

As shown in FIGS. 1 through 3, the optical writing unit 7 includes a laser unit 21 which emits a laser beam modulated in accordance with an image signal to be recorded, and the laser beam emitted from the laser unit 21 is reflected by a first mirror 22 to thereby impinge on a deflection mirror 24 having a plurality of facets, which is fixedly mounted on a rotatnng shaft of a scanner motor 23 and thus rotates in a predetermined direction at constant speed. Thus, as the deflection mirror 24 rotates, the laser beam is periodically deflected over a predetermined angle by each of the facets of the rotating deflection mirror 24. The laser beam thus deflected by the deflection mirror 24 passes through an f$\theta$ lens 25, a second mirror 26 and a cylindrical lens 27 to finally impinge on the photosensitive drum 1. As a result, the laser beam scans across the photosensitive drum 1 in the widthwise direction to thereby carry out the so-called main scanning or optical scanning. Since the photosensitive drum 1 is driven to rotate in a predetermined direction, there is provided a relative movement between the laser beam and the peripheral surface of the photosensitive drum 1, which defines the so-called auxiliary scanning. As a result, as the photosensitive drum 1 rotates, the laser beam carrying image information to be recorded scans across the drum 1 in its widthwise direction to thereby form an electrostatic latent image on the photosensitive drum 1. It is to be noted that as shown in FIG. 3 all of the elements defining the optical writing unit 7 are directly mounted on a base cover 28 which constitutes part of the machine housing of the present laser printer. As shown in FIG. 3, also provided as mounted on the base plate 28 is a sync detecting sensor 29 which detects the deflected laser beam at the beginning of its scanning.

An electrostatic latent image formed on the photosensitive drum 1 by the optical scanning effected by the optical writing unit 7 is then developed with toner by the developing unit 3 to thereby define a toner image which is then transferred to the sheet of transfer paper supplied from the pair of registration rollers 11 and 12 by means of the image transfer corona unit 4. After image transfer, the sheet of transfer paper is separated from the photosensitive drum 1 and then transported through the image fixing unit 13 to thereby have the transferred toner image permanently fixed on the sheet of transfer paper. Finally, the sheet of transfer paper is discharged onto the paper discharge tray 14. Any remaining toner on the photosensitive drum 1 after image transfer is removed by the cleaning unit 5 to be ready for the next cycle of operation.

As described above, in the present laser printer, the optical writing unit 7 is disposed below the horizontal level defined by the photosensitive drum 1 and also below the developing unit 3 and the automatic paper feeding unit 8 is disposed below the optical writing unit 7; whereas, the image transfer station including the image transfer unit 4 and the registration station including the pair of registration rollers 11 and 12 are disposed above the horizontal level defined by the photosensitive drum 1. As a result, the paper transportation path may be defined as extending from the supply end of the paper supplying unit 8 to the pair of registration rollers 11 and 12 around the developing unit 3 generally in the shape of "U". Therefore, the overall structure of the present laser printer can be made extremely compact in size.

In the illustrated embodiment, the machine housing is generally comprised of two parts: base cover 28 and a top cover which includes a movable portion 30 which is pivotted to the base cover 28 at a pivot 31. Thus, the movable portion 30 of the top cover may be pivotted open or closed by having it pivotted around the pivot 31. In the illustrated embodiment, the image transfer unit 4 and the upper registration roller 11 are mounted on the movable portion 30 of the top cover. The photosensitive drum 1 and the lower registration roller 12 are supported such that they may be selectively mounted on the movable portion 30 of the top cover or on the base cover 28.

Figure 4:
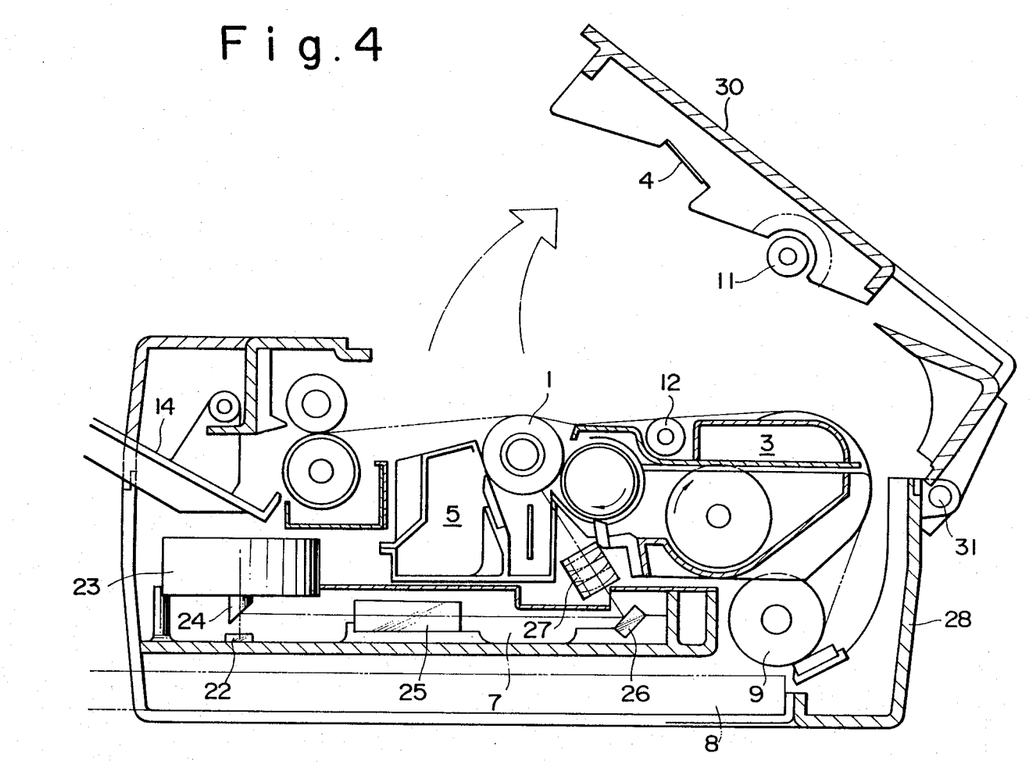
FIGS. 4 through 6 are schematic illustrations showing various possible modifications of the laser printer of the present embodiment.

With this structure, if a sheet of transfer paper has jammed at the image transfer station or at the pair of registration rollers 11 and 12, the movable portion 30 of the top cover may be pivotted open as shown in FIG. 4. Since the image transfer unit 4 and the upper registration roller 11 are mounted on the movable portion 30 of the top cover, these components are also moved away from their associated components mounted on the base cover 28 to completely open the paper transportation path, thereby providing a complete accessibility to every section of the paper transportation path. As a result, the operator can remove the jammed paper from the paper transportation path with ease. As an alternative structure, it may be so structured that the the movable portion 30 of the top cover is spring-biased such that the movable portion 30 has a tendency to take its open position as shown in FIG. 4 and hook means is provided between the movable portion 30 and the stationary portion of the top cover for keeping the movable position 30 at its closed position when hooked. With this alternative structure, the movable portion 30 may automatically move toward its open position simply by unhooking the hooking means between the movable portion 30 and the stationary portion of the top cover.

Figure 5:
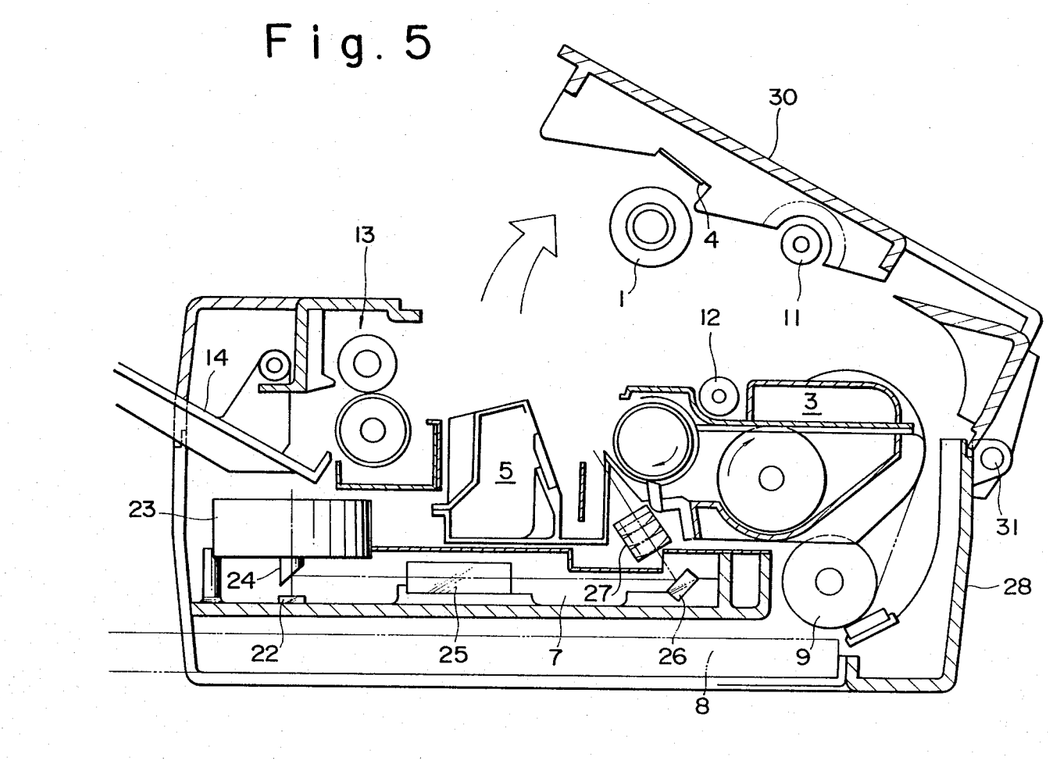
Figure 6:
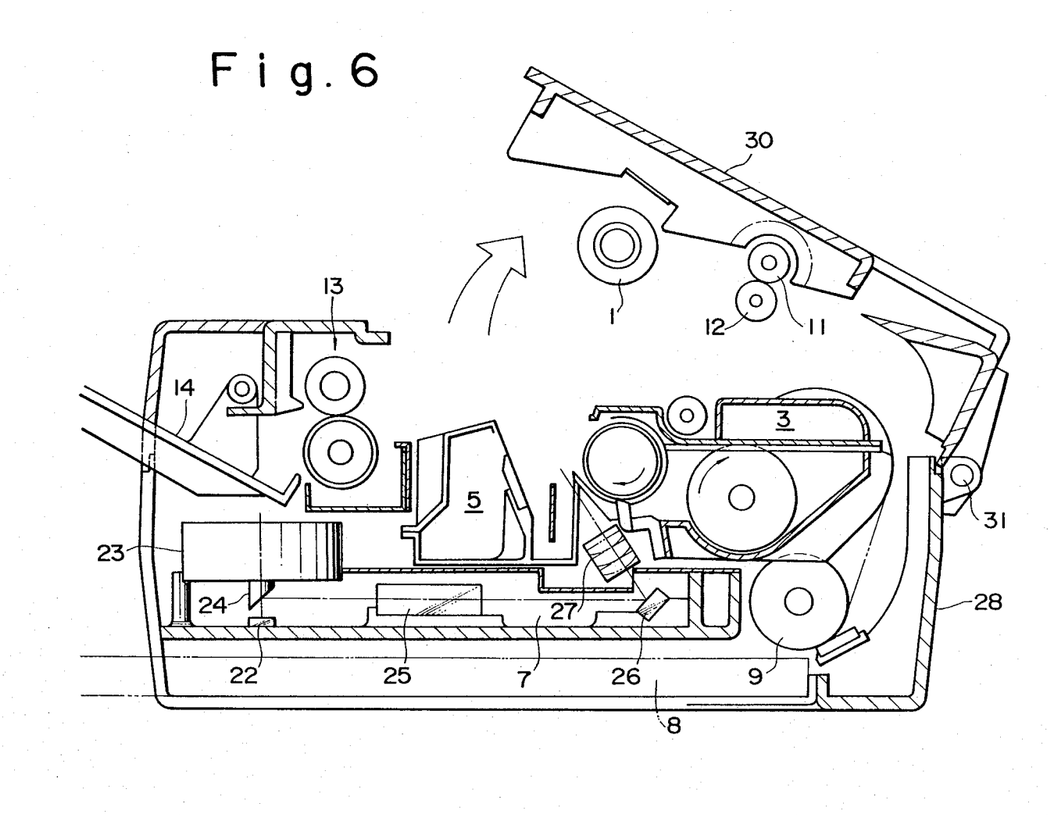

FIG. 5 shows a modification of the present laser printer in which the photosensitive drum 1 is also mounted on the movable portion 30 of the top cover in addition to the image transfer unit 4 and the upper registration roller 11. With this structure, replacement of photosensitive drums can be carried out extremely easily. FIG. 6 shows another modification of the present laser printer in which not only the photosensitive drum 1 but also the lower registration roller 12 are also mounted on the movable portion 30 of the top cover in addition to the image transfer unit 4 and the upper registration roller 11. With this structure, replacement of cleaning units and/or developing units will be facilitated significantly. Although not shown, it may also be so structured that selecting means be provided for selecting that at least one of the photosensitive drum 1 and the lower registration roller 12 may be mounted either on the movable portion 30 of the top cover or on the base cover selectively, if desired.

Referring again to FIG. 3, it is to be noted that those components, constituting the optical writing unit 7, which include the laser unit 21, first mirror 22, scanner motor 23, deflection mirror 24, fθ lens 25, and second mirror, are all mounted on an optical writing unit housing 28a which in turn constitutes part of the base cover 28, and thus the housing 28a is integral with the base cover 28. The paper feed cassette 8 is detachably mounted on the base cover 28 so is the developing unit 3. In addition, the image fixing unit 13, cleaning unit 5, a transfer paper feeding and transporting system, a control board, a power supply unit, etc. are also mounted on the base cover 28. Since the optical writing unit housing 28a is integral with the base cover 28 of the machine housing, components for mounting the optical writing unit housing 28a to the base unit 28 are not required so that the number of components and mounting steps is reduced, which could contribute to lower the cost. With this integrated housing structure, since various components are mounted on the base cover 28, it is preferable to provide a structure which prevents any vibration induced by any of the components mounted on the base cover 28 from adversely affecting those elements of the optical writing unit 7 mounted on the optical writing unit housing 28a. As an example, a rib structure may be provided at the bottom of the optical writing unit housing 28a to provide an enhanced rigidity.

In the illustrated embodiment, the paper feed cassette 8 is disposed below the optical writing unit housing 28a. As an alternative structure, it may be so structured that a controller for controlling the overall operation of the laser printer may be disposed below the optical writing housing 28a, if desired.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An image recording apparatus comprising:
   a photosensitive member for forming an image thereon;
   optical writing means disposed below a first horizontal level defined by the location of said photosensitive member for applying a light beam carrying image information to be recorded onto said photosensitive member to thereby form an electrostatic latent image thereon;
   developing means for developing said electrostatic latent image to thereby form a developed image;
   paper supplying means disposed below a second horizontal level defined by the location of said optical writing means for supplying transfer paper to be transported along a predetermined paper transportation path defined in said apparatus; and
   image transferring means disposed above said first horizontal level for transferring said developed image from said photosensitive member onto said transfer paper while said transfer paper is being transported between said photosensitive member and said image transferring means.

2. The apparatus of claim 1 wherein said developing means is disposed substantially at said first horizontal level and thus substantially in a side-by-side relationship with said photosensitive member, and said apparatus further comprises a pair of upper and lower registration rollers disposed above said developing means.

3. The apparatus of claim 2 wherein said paper transportation path includes a path section which extends from a supply end of said paper supplying means to said pair of upper and lower registration rollers around said developing means.

4. The apparatus of claim 3 wherein said path section extending around said developing means is generally U-shaped.

5. The apparatus of claim 2 further comprising a machine housing which encloses all of the above-mentioned elements recited in claim 1 and said machine housing has a movable portion which may move between an open position and a closed position.

6. The apparatus of claim 5 wherein said upper registration roller is mounted on said movable portion.

7. The apparatus of claim 6 wherein said lower registration roller is also mounted on said movable portion.

8. The apparatus of claim 5 wherein said photosensitive member is mounted on said movable portion.

9. The apparatus of claim 5 wherein said movable portion is pivotally movable between said open and closed positions with respect to the rest of said machine housing.

10. The apparatus of claim 5 wherein said photosensitive member is a rotatably supported photosensitive drum.

11. The apparatus of claim 10 wherein said optical writing means includes a laser beam scanning unit mounted on an optical writing unit housing which is formed integral with said machine housing.

12. The apparatus of claim 11 wherein said paper supplying means includes a paper feed cassette which is located immediately below said optical writing means when detachably set in position.

13. The apparatus of claim 1 wherein said optical writing means is disposed below said photosensitive member and also at least a part of said developing means.

14. The apparatus of claim 1 further comprising image fixing means disposed substantially at said first horizontal level and thus substantially in a side-by-side relationship with said photonsensitive member but at a side opposite to said developing means.

* * * * *